Figure 1:
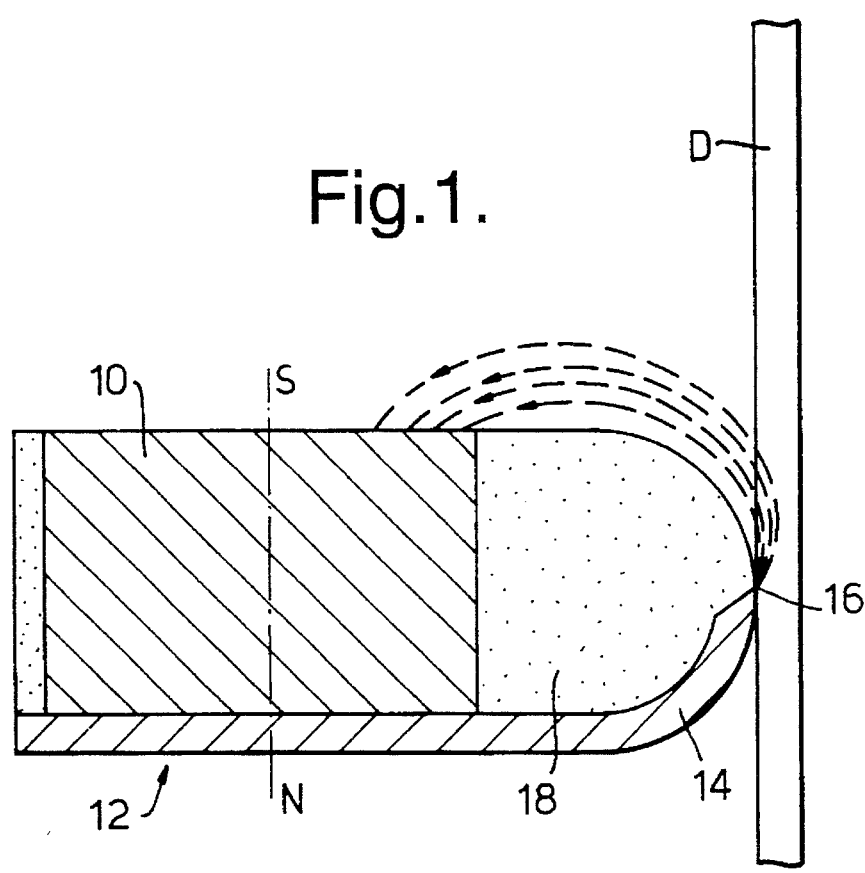

United States Patent
Stiernspetz

[19]

[11] Patent Number: 5,515,020
[45] Date of Patent: May 7, 1996

[54] PREMAGNETIZING HEAD

[75] Inventor: Allan Stiernspetz, Vikingstad, Sweden

[73] Assignee: ICL Systems Aktiebolag, Kista, Sweden

[21] Appl. No.: 39,216
[22] PCT Filed: Aug. 14, 1992
[86] PCT No.: PCT/SE92/00549
    § 371 Date: May 12, 1993
    § 102(e) Date: May 12, 1993
[87] PCT Pub. No.: WO93/04441
    PCT Pub. Date: Mar. 4, 1993

[30] Foreign Application Priority Data

Aug. 14, 1991 [SE] Sweden ................ 9102353

[51] Int. Cl.$^6$ ................ H01F 7/02; H01F 7/20
[52] U.S. Cl. ................ 335/302; 335/304; 335/284
[58] Field of Search ................ 335/302, 284, 335/285, 304

[56] References Cited

U.S. PATENT DOCUMENTS

| | | | |
|---|---|---|---|
| 2,230,913 | 2/1941 | Schüller | 179/100.2 |
| 3,331,043 | 7/1967 | Orzabal | 335/285 |
| 3,638,238 | 1/1972 | Milford et al. | 340/146.3 |
| 3,858,136 | 12/1974 | Jun | 335/284 |
| 4,922,086 | 5/1990 | Milford | 235/449 |
| 5,045,962 | 9/1991 | Inoue | 360/128 |
| 5,051,853 | 9/1991 | Hosoya | 360/99 |

FOREIGN PATENT DOCUMENTS

| | | | |
|---|---|---|---|
| 2536187 | 5/1984 | France . | |
| 849878 | 7/1952 | Germany | 335/302 |
| 0124761 | 5/1988 | Japan | 335/284 |
| 3173406 | 7/1991 | Japan | 335/284 |

Primary Examiner—Michael W. Phillips
Assistant Examiner—Stephen T. Ryan
Attorney, Agent, or Firm—Ladas & Parry

[57] ABSTRACT

A premagnetizing head for charging the magnetizable pigment of characters printed on a document includes a permanent magnet (10) whose one pole is connected to a magnetically conductive metal plate (12) which extends away from the magnet (10) in a direction generally transversal to the north-south pole axis of the magnet and up to the document (D) whose characters are to be magnetized and read. The permanent magnet (10) is oriented so that its northpole-southpole axis will extend generally parallel with the plane of the document (D) to be read.

1 Claim, 1 Drawing Sheet

PREMAGNETIZING HEAD

The present invention relates to a premagnetizing head which is intended for use with a document reader and which functions to charge magnetizable pigment of characters printed on a document, and which includes a permanent magnet whose north-south axis extends generally parallel with the plane of the document to be read.

In addition to a read head, apparatus that are intended to read information characters printed on documents such as bankbooks, cheques, forms and the like also include a premagnetizing head which functions to magnetize the magnetic pigment of characters, prior to sweeping the read head over said characters. One example of readers of this kind is found in the standardized "CMC-7-reader" which is intended to be fitted to a printer at a location adjacent the printer head, where the space available is extremely limited.

When apparatus of this kind are fitted with an additional read head for simultaneous reading of information on a magnetic strip located on the rear side of a bankbook or some like document, the magnetic field deriving from the permanent magnetic will sometimes penetrate the document when premagnetizing the characters on the front of the document and therewith erase the magnetism of the magnetic strip on the back of the document, therewith making it impossible to use simple permanent magnets in cases such as these.

Attempts have been made to solve this problem with the aid of controllable electromagnetic coils which are switched off temporarily when such documents are fed through the read and write equipment. These electromagnetic coils, however, are so large and bulky that the space available adjacent the printing head is insufficient for the purpose of fitting the coils. Furthermore, the coils are relatively expensive.

It is the object of the present invention to remove the aforesaid problem and to provide a solution which will enable the use of a simple, small and inexpensive permanent magnet whose magnetic field will not penetrate through a document, such as bankbooks and the like, and therewith erase the magnetism of a magnetic strip on the back of the document.

To this end the inventive premagnetizing head is characterized in that one pole of the permanent magnet is connected to a magnetically conductive metal plate which extends away from the magnet, generally transversal to its north-south axis, and up to the document whose characters are to be premagnetized and read. The magnetism is thereby led away from the magnet such as to obtain a well-defined, rapid deflection of the magnetic field in a direction towards an opposing pole-end of the permanent magnet at that end of the metal plate which faces towards the document, wherein the strength of the magnetic field diminishes in a direction towards the rear side of the document so rapidly as to have no influence on a magnetic strip which is located at a distance of 2 mm or more from the head.

It is preferable to attach one pole-side of the permanent magnet to the metal plate, wherein the end of the plate that faces towards the document to be read is curved towards the other pole-side of the magnet and wherein this end of the metal plate preferably has a pointed terminating edge.

Figure 2:
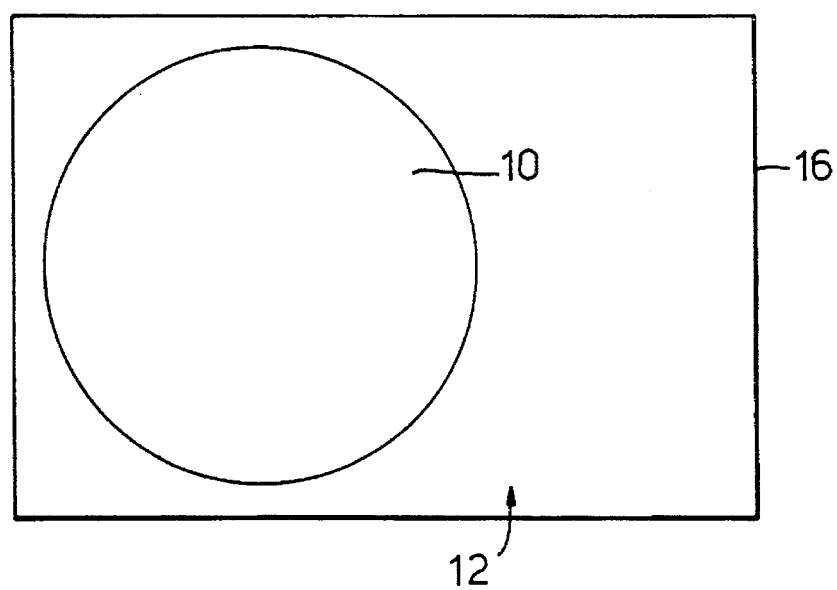

The invention will now be described in more detail with reference to the accompanying drawing, in which FIG. 1 is a greatly enlarged cross-sectional view of an inventive premagnetizing head, and FIG. 2 is a top view of the head shown in FIG. 1.

The illustrated inventive premagnetizing head includes a round permanent magnet 10 having a north pole N and a south pole S. Attached to the north-pole side N of the magnet is a magnetically conductive plate 12. The plate 12 is attached so that a part 14 thereof will project outwards transversely from the magnet 10, said part curving upwards towards the south-pole side S of the magnet. The outer end of the part 14 of the metal plate therewith forms a pointed terminating edge 16 which, when the head is used in a document reader, is intended to lie in abutment with a bypassing document which carries magnetizable characters that are to be magnetized and read.

The permanent magnet 10 is positioned so that its north-south axis will extend parallel with the plane of the document to be read. The permanent magnet may be surrounded by a plastic mass 18 or some other non-magnetic material which suitably follows the contours of the upwardly curved plate-part 14 so as to lie smoothly and gently against the document whose printed characters are to be magnetized and read. The other pole of the magnet 10, i.e. the south pole in the embodiment shown, will preferably have a position such that the magnetic field from the part 14 of the magnetically conductive plate 12 is deflected essentially abruptly from the document. In the FIG. 1 embodiment this is achieved by placing the south pole side of the permanent magnet 10 at a distance from the document D. The plastic material 18 therefore has a substantial thickness on the side of the permanent magnet 10 that faces towards the document D. In the embodiment shown, this thickness is greater than the radius of the permanent magnet 10.

As will be seen from FIG. 1, the plate-part 14 conducts magnetism out from the magnet 10 so that when the magnetic field leaves the edge 16, the field will be deflected strongly towards the south-pole side S. As a result, the depth to which the magnetic field penetrates the document D will be very short, but, despite this, will have a sufficiently strong local field strength to charge the magnetizable pigments of the characters printed on the adjacent side of the document D. Because the depth to which the magnetic field penetrates the document is very slight (about 2 mm at maximum), magnetic strips located on the back of the document will not be influenced by the field, the thickness of which document, such as a bankbook or a like document, exceeds about 2 mm.

I claim:

1. A premagnetising head which is intended for use with document readers and which functions to charge the magnetizable pigment of characters printed on a document and includes a permanent magnet which is orientated so that its northpole-southpole-axis, which is a straight line, will extend in use generally parallel with the plane of the document to be read, characterised in that one pole of the permanent magnet is connected to a magnetically conductive plate having a portion which extends away from the one pole of the magnet for a predetermined distance in a direction generally transversal to the north-south pole axis of the magnet and towards where, in use, the document whose characters are to be magnetized and read is located, said plate portion having an end portion which in use extends up to the document whose characters are to be magnetized and read, in that the other pole of the permanent magnet has such a position in relation to the end portion of the magnetically conductive plate that faces towards the document and is spaced therefrom by said predetermined distance that the magnetic field from the end portion of the magnetically conductive plate is, in use, strong at a point close to the plate whereby to charge the magnetizable pigment of the characters and yet is deflected essentially abruptly towards the other pole and away from the document, in that said plate portion is turned up at said end portion and curves in a direction towards the other pole of the magnet, and has a pointed terminating edge on said end portion.

* * * * *